US011765802B2

(12) United States Patent
Maldoner (10) Patent No.: US 11,765,802 B2
(45) Date of Patent: Sep. 19, 2023

(54) ISOLATED PRIMARY SIDE SWITCHED CONVERTER FOR LED LOADS

(71) Applicant: Tridonic GmbH & Co KG, Dornbirn (AT)

(72) Inventor: Jakob Maldoner, Dornbirn (AT)

(73) Assignee: Tridonic GmbH & Co KG, Dornbirn (AT)

( * ) Notice: Subject to any disclaimer, the term of this patent is extended or adjusted under 35 U.S.C. 154(b) by 0 days.

(21) Appl. No.: 17/912,948

(22) PCT Filed: Mar. 22, 2021

(86) PCT No.: PCT/EP2021/057289
§ 371 (c)(1),
(2) Date: Sep. 20, 2022

(87) PCT Pub. No.: WO2021/209227
PCT Pub. Date: Oct. 21, 2021

(65) Prior Publication Data
US 2023/0132668 A1  May 4, 2023

(30) Foreign Application Priority Data

Mar. 24, 2020 (EP) .................................... 20165072

(51) Int. Cl.
*H05B 45/382* (2020.01)
*H02M 3/335* (2006.01)
*H02M 3/00* (2006.01)

(52) U.S. Cl.
CPC ............ *H05B 45/382* (2020.01); *H02M 3/01* (2021.05); *H02M 3/33571* (2021.05)

(58) Field of Classification Search
CPC .... H05B 45/382; H02M 3/33571; H02M 3/01
See application file for complete search history.

(56) References Cited

U.S. PATENT DOCUMENTS 4,717,889 A * 1/1988 Engelmann ........... H03F 1/0227
363/43
2011/0080102 A1 4/2011 Ge et al.
(Continued)

OTHER PUBLICATIONS

PCT/EP2021/057289, International Search Report and Written Opinion dated Jul. 26, 2021, 5 pages.

*Primary Examiner* — Jue Zhang
(74) *Attorney, Agent, or Firm* — Andrus Intellectual Property Law, LLP (57) ABSTRACT

An isolated primary side switched converter (100) has a galvanic isolation stage (105) separating a primary side (101) and a secondary side (103). The secondary side winding (107) is connected to a rectification circuit and has a center tap. A first terminal (T1), a second terminal (T2) and a third terminal (T3) are provided for connecting one or more LED loads (LED1, LED2) to the secondary side (103) of the converter (100). The rectification circuit (109) is configured to set the first terminal (T1) at a positive electrical polarity and to set the second terminal (T2) at a negative polarity. The third terminal (T3) is electrically connected to the center tap. One or two LED loads can be connected between T1 and T3 (low voltage) and T2 and T3 (low voltage), or in one embodiment a single LED load can also be connected between T1 and T2 (high voltage).

13 Claims, 6 Drawing Sheets

(56) References Cited

U.S. PATENT DOCUMENTS

| 2016/0049879 A1* | 2/2016 | Park | H05B 45/382 |
| | | | 363/21.1 |
| 2019/0261475 A1* | 8/2019 | Grady | F21S 8/085 |

* cited by examiner

ISOLATED PRIMARY SIDE SWITCHED CONVERTER FOR LED LOADS

CROSS REFERENCE TO RELATED APPLICATIONS

The present application is the U.S. national stage application of international application PCT/EP2021/057289 filed Mar. 22, 2021, which international application was published on Oct. 21, 2021 as International Publication WO 2021/209227 A1. The international application claims priority to European Patent Application No. 20165072.8 filed Mar. 24, 2020.

TECHNICAL FIELD OF THE INVENTION

The invention relates to an isolated primary side switched converter, in particular an LLC converter, for supplying LED (light emitting diode) loads and to a driver comprising such a converter.

BACKGROUND OF THE INVENTION

Converters, such as LLC converters, are generally known. For instance, such converters can be implemented in LED drivers to provide a stable DC supply voltage for an LED load.

LLC converters generally comprise a transformer which is arranged between a primary and a secondary side of the converter, wherein both sides are galvanically isolated from each other. A capacitor is usually provided on the secondary side to convert the AC voltage applied to a secondary side winding into a DC voltage, which is then used to supply the LED load.

Different topologies or configurations for the design of the secondary side are known, which differ in the position of the capacitor and the use of rectification circuits on the secondary side.

However, the possibilities to connect an LED load to a secondary side of an LLC converter and the voltage range provided to such an LED load is strongly limited by the known LLC designs.

Thus, it is an objective of the invention to provide an improved primary side switched converter, which avoids the above-mentioned disadvantages. In particular, it is an object of the invention to provide a converter that offers a higher variability of the output voltage.

SUMMARY OF THE INVENTION

The object of the present invention is achieved by the solution provided in the enclosed independent claims. Advantageous implementations of the present invention are further defined in the dependent claims.

According to a first aspect, the invention relates to a isolated primary side switched converter, comprising a galvanic isolation stage separating a primary side and a secondary side of the converter, a secondary side winding of the isolation stage, wherein the secondary side winding is coupled to a primary side winding, and wherein the secondary side winding comprises a center tap, a first terminal, a second terminal and a third terminal for connecting an LED load on the secondary side of the converter, a rectification circuit on the secondary side of the converter, wherein the rectification circuit is configured to set the first terminal at a first electrical polarity, and to set the second and the third terminal at a second electrical polarity that is different to the first electrical polarity, wherein the third terminal is electrically connected to the center tap, and wherein a voltage between the second and the first terminal is larger than a voltage between the third and the first terminal. This provides the advantage, that LED loads can be supplied with different voltages by the same secondary side of a converter.

For instance, the first polarity is a negative polarity and the second polarity is a positive polarity.

In particular, the phrases "voltage between the second and the first terminal" and "voltage between the third and the first terminal" refers to absolute values of said voltages. In other words, the absolute value of the voltage between the second and the first terminal is larger than be absolute value of the voltage between the third and the first terminal.

In particular, the absolute value of the voltage between the first and the second terminal is double the voltage between the first and the third terminal.

Preferably, the second terminal is a high voltage terminal and the third terminal is a low voltage terminal.

Preferably, the second terminal is at a larger electrical potential than the third terminal. In particular, the absolute value of the electrical potential at the second terminal is larger than at the third terminal.

Preferably, all terminals of the converter are connected to the secondary side winding via the same electrical power path on the secondary side of the converter.

The center tap can be an electrical contact at a point halfway along the secondary side winding. In other words, the secondary side winding can be a single winding with an electrical connection in the center.

Alternatively, the secondary side winding can comprise two winding sections with the same number of windings that are connected in series, e.g. via an electrical line, wherein the center tap corresponds to an electrical connection between the two sections.

The LED load can comprise an LED, an LED module and/or an LED track. In particular, the LED load connected to the terminal can comprise several LEDs or modules, e.g. a first LED connected between the first and the second terminal and a second LED connected between the first and the third terminal.

In an embodiment, the LED load is connectable between the first and the second terminal, between the first and the third terminal and/or between the second and the third terminal.

The terminals can be configured to allow connecting more than one LED load to each terminal at the same time. For instance, one LED load can be connected between the first and the second terminal and one additional LED can be connected between the first and the third terminal at the same tame. Likewise, one LED load can be connected between the first and the second terminal and one additional LED load can be connected between the second and the third terminal at the same time.

In an embodiment, the secondary side winding comprises no further tapping besides the center tap. This achieves the advantage that the secondary side winding can be a simple center tap winding of low complexity and low cost.

Preferably, the secondary side winding comprises electrical connections at both ends, wherein the secondary side winding comprises no further electrical connections besides said electrical connections at both ends and the center tap.

In an embodiment, the converter comprises a decoupling circuit for reducing voltage fluctuations between the terminals. This achieves the advantage that the LED load is supplied with a steady DC voltage.

In particular, the decoupling circuit is configured to reduce voltage fluctuations between the first and the second terminal, between the second and the third terminal, and/or between the first and the third terminal.

In an embodiment, the decoupling circuit comprises a first capacitor that is connected in parallel between the first and the second terminal or between the second and the third terminal. This achieves the advantage that the LED load is supplied with a steady DC voltage.

In an embodiment, the decoupling circuit comprises a second capacitor that is connected in parallel between first and the third terminal. This achieves the advantage that the LED load is supplied with a steady DC voltage.

In an embodiment, the first and the second capacitor have the same capacitance.

In an embodiment, the rectification circuit comprises a center tap rectifier. This achieves the advantage, that a voltage supplied to the terminals can be rectified efficiently.

In particular, the center tap rectifier is connected to the center tap of the secondary side winding.

In an embodiment, the rectification circuit comprises a full wave bridge rectifier. This achieves the advantage, that a voltage supplied to the terminals can be rectified efficiently.

In particular, the rectification circuit comprises a combination of the center tap rectifier and the full wave bridge rectifier.

In an embodiment, the rectification circuit comprises four diodes or four switches, in particular MOSFETs (metal-oxide-semiconductor field-effect transistors).

In an embodiment, the isolated primary side switched converter is a resonant converter, preferably an LLC converter, in particular a resonant half bridge LLC converter.

According to a second aspect, the invention relates to a driver for light sources, in particular LED or LED modules, comprising the isolated primary side switched converter according to the first aspect of the invention.

The above description with regard to the primary side switched converter according to the present invention is correspondingly valid for the driver according to the present invention.

BRIEF DESCRIPTION OF THE DRAWINGS

The invention will be explained in the followings together with the figures.

DETAILED DESCRIPTION OF THE PREFERRED EMBODIMENTS

The present invention is described more fully hereinafter with reference to the accompanying drawings, in which various aspects of the present invention are shown. This invention however may be embodied in many different forms and should not be construed as limited to the various aspects of the present invention presented through this disclosure. Rather, these aspects are provided so that this disclosure will be thorough and complete, and will fully convey the scope of the present invention to those skilled in the art. The various aspects of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus.

Various aspects of an isolated primary side switched converter will be presented. However, as those skilled in the art will readily appreciate, these aspects may be extended to aspects of converters in general without departing from the invention.

The term "LED luminaire" shall mean a luminaire with a light source comprising one or more LEDs and a driver to operate the LEDs as well as a housing. LEDs are well-known in the art, and therefore, will only briefly be discussed to provide a complete description of the invention.

It is further understood that the aspect of the present invention might contain integrated circuits that are readily manufacturable using conventional semiconductor technologies, such as complementary metal-oxide semiconductor technology, short "CMOS". In addition, the aspects of the present invention may be implemented with other manufacturing processes for making optical as well as electrical devices. Reference will now be made in detail to implementations of the exemplary aspects as illustrated in the accompanying drawings. The same references signs will be used throughout the drawings and the following detailed descriptions to refer to the same or like parts.

Figure 1:
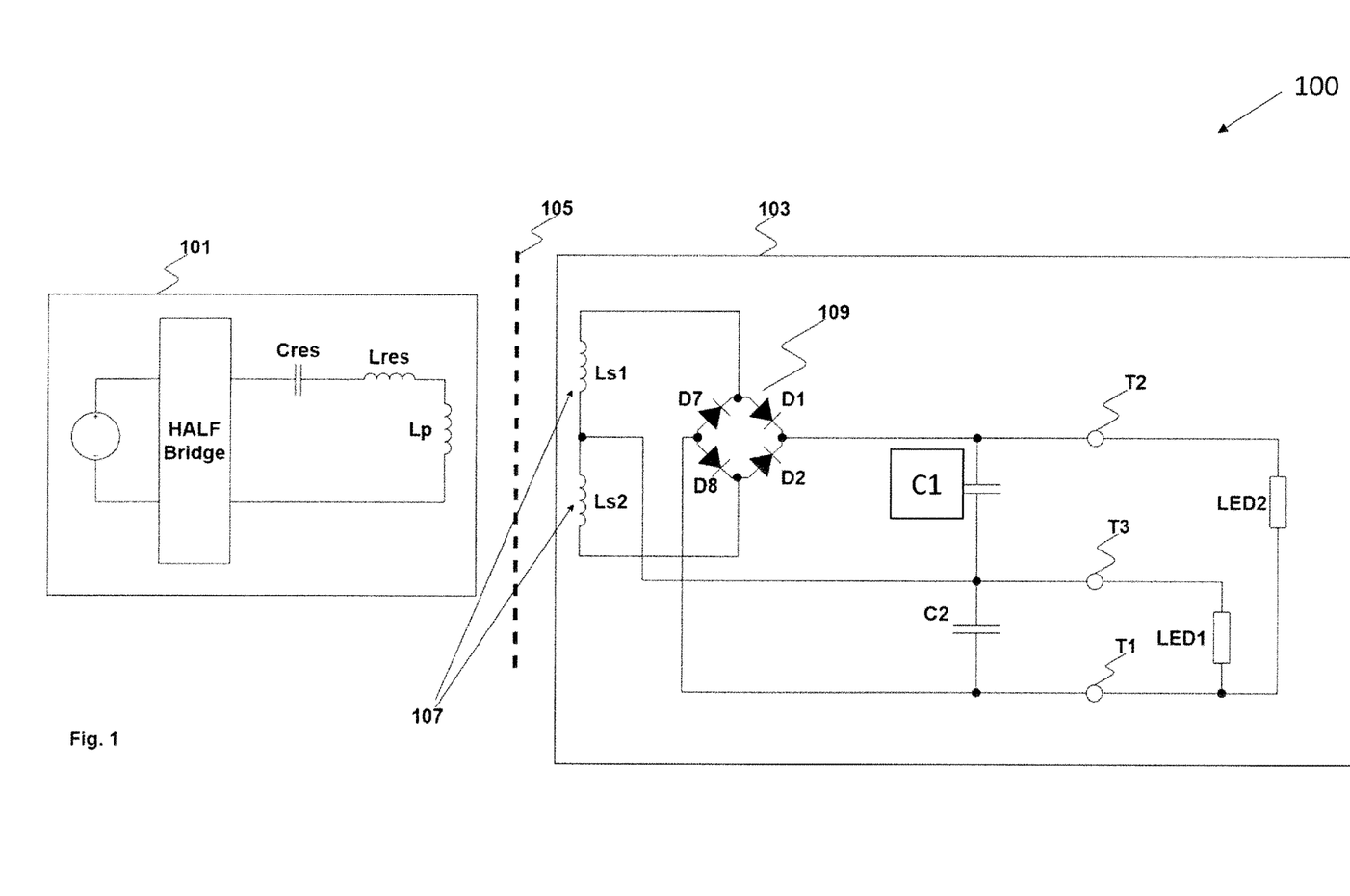
FIG. 1 shows a schematic diagram of a primary side switched converter according to an embodiment.

FIG. 1 shows a schematic diagram of a primary side switched converter 100 according to an embodiment.

The converter 100 comprises a galvanic isolation stage 105 separating a primary side 101 and a secondary side 103 of the converter 100, a secondary side winding 107 of the isolation stage 105, wherein the secondary side winding 107 is coupled to a primary side winding, and wherein the secondary side winding 107 comprises a center tap, a first terminal T1, a second terminal T2 and a third terminal T3 for connecting an LED load LED1, LED2 on the secondary side 103 of the converter 100.

The converter 100 further comprises a rectification circuit 109 on the secondary side 103 of the converter 100, wherein the rectification circuit 109 is configured to set the first terminal T1 at a first electrical polarity, and to set the second terminal T2 and the third terminal T3 at a second electrical polarity that is different to the first electrical polarity.

The third terminal T3 is electrically connected to the center tap of the secondary side winding 107, wherein a voltage between the second terminal T2 and the first terminal T1 is larger than a voltage between the third terminal T3 and the first terminal T1.

In particular, the first polarity is a negative polarity and the second polarity is a positive polarity.

Preferably, the second terminal T2 is at a larger electrical potential than the third terminal T3. In particular, the absolute value of the electrical potential at the second terminal T2 is larger than that at the third terminal T3.

As shown in FIG. 1, the LED load LED1, LED2 is connectable between the first terminal T1 and the second terminal T2 and/or between the first terminal T1 and the third terminal T3. Further, the LED load can also be connected between the second terminal T2 and the third terminal T3.

The first terminal T1, the second terminal T2 and/or the third terminal T3 can be configured to allow connecting multiple LED loads, in particular multiple LED or modules, simultaneously.

In other words, the first terminal T1 and the second terminal T2 form a first connection for connecting the LED load, and the first terminal T1 and the third terminal T3 form a second connection for connecting LED load, wherein the first connection provides larger supply voltage to the LED load than the second connection. Furthermore, also the second terminal T2 and the third terminal T3 can form a connection for connecting the LED load.

In particular, the first terminal T1 is connected to ground.

In FIG. 1, the LED load comprises two LED LED1, LED2, wherein LED1 is connected between the third terminal T3 and the first terminal T1, and LED2 is connected between the second terminal T2 and the first terminal T1. Thus, the LED2 receives a larger supply voltage than the LED1.

In FIG. 1, the secondary side winding 107 is depicted as two separate winding sections Ls1, Ls2 in series. Both winding sections Ls1, Ls2 comprise the same number of windings. The center tap is formed by an electrical connection between both windings sections Ls1, Ls2.

Preferably, the secondary side winding 107 comprises no additional tapping besides said center tap.

In FIG. 1, the secondary side winding 107 is connected to the rectification circuit 109 via two resistances R3, R5.

Preferably, the rectification circuit 109 is configured to rectify an AC voltage provided by the secondary side winding 107 to a DC voltage of constant polarity.

The rectification circuit 109 comprises a center tap (or middle tap) rectifier having two diodes D1, D2 on its two branches.

Preferably, each branch of this center tap rectifier is extended by one additional diode D7, D8. In particular, the additional diodes D7, D8 are connected antiparallel to the respective diodes D1, D2 of each branch.

The so extended rectification circuit 109 with four diodes D1, D2, D7, D8, can form a full wave bridge rectifier that connects the secondary side winding 107 to the terminals T1, T2, T3.

Instead of diodes D1, D2, D7, D8, the rectification circuit 109 can comprise four switches, in particular MOSFETs.

The rectification circuit 109 can be configured to rectify the AC voltage provided by the secondary side winding 107 in synchronous fashion, in particular by using synchronously switched switches instead of the diodes D1, D2, D7, D8.

The converter 100 can further comprise a decoupling circuit for reducing voltage fluctuations, in particular a ripple voltage, on the connected LED load LED1, LED2.

In FIG. 1, the decoupling circuit comprises a first capacitor C1 that is connected in parallel between the second terminal T2 and the third terminal T3, and a second capacitor C2 that is connected in parallel between the third terminal T3 and the first terminal T1.

Preferably, the first capacitor C1 and the second capacitor C2 have the same capacitance.

In FIG. 1, the decoupling circuit is symmetrical, i.e. the first capacitance C1 is in parallel to the first winding section Ls1 and the second capacitance C2 is in parallel to the second winding section Ls2 of the secondary side winding 107.

This allows several configurations for connecting an LED load of two separate LED LED1, LED2:

If one LED LED2 is connected between second terminal T2 and third terminal T3, in parallel to the first capacitor C1, and a further LED LED1 is connected between the third terminal T3 and the first terminal T1, in parallel to the second capacitor C2, than both LEDs LED1, LED2 are supplied with an identical lower voltage (LV) (this configuration is not shown in FIG. 1). For instance, this lower voltage is between 10V and 20V. Further, the voltage supplied to each LED LED1, LED2 is filtered by the respective capacitor C1 or C2, which is in parallel to the respective LED LED1, LED2. The first capacitor C1 is connected between the second and the third terminal (T2, T3).

If, however, one LED LED2 is connected between the second terminal T2 and the first terminal, as shown in FIG. 1, than both capacitors C1, C2 act as decoupling filters for this LED LED2. In this case, one LED LED2 bridges both capacitors C1, C2 and is thus supplied with a higher voltage (HV). For instance, this higher voltage is between 30V and 60V.

Figure 2:
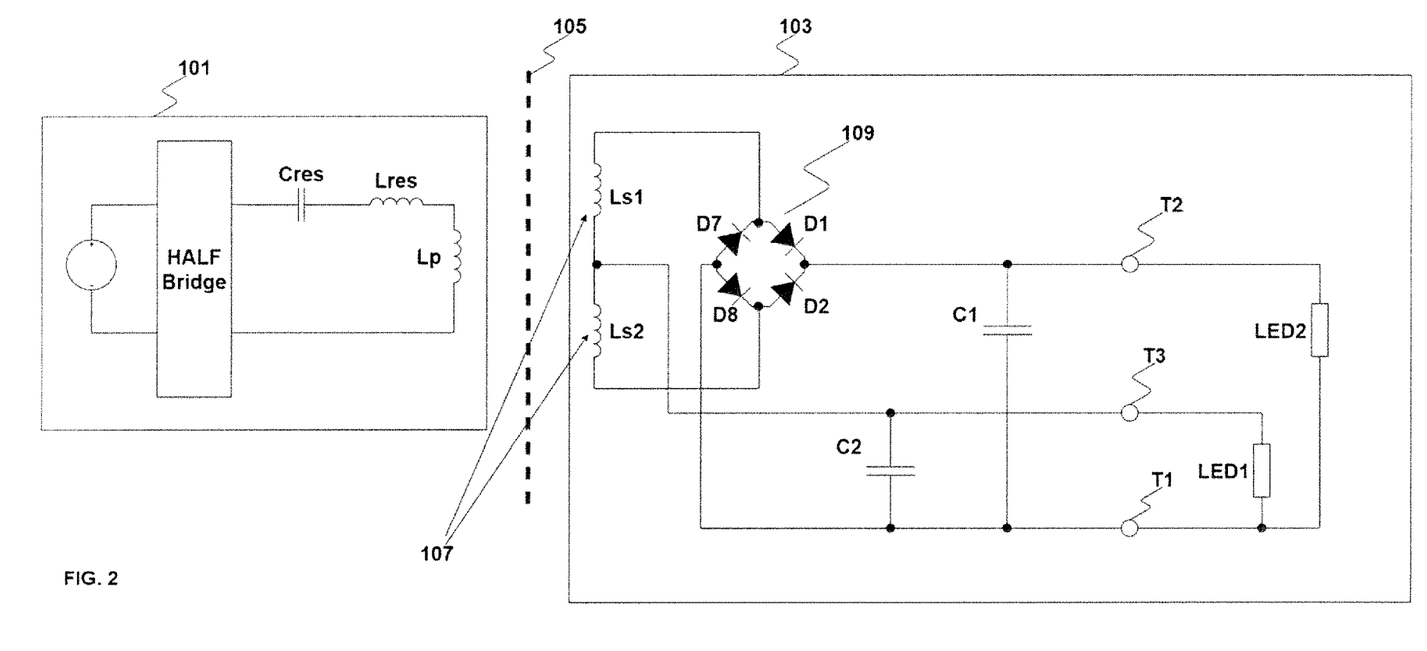
FIG. 2 shows a schematic diagram of a primary side switched converter according to an embodiment.

FIG. 2 shows a schematic diagram of the primary side switched converter 100 according to another embodiment.

In FIG. 2, the second capacitor C2 is connected between the second terminal T2 and the first terminal T1 and in parallel to the entire secondary side winding 107. The first capacitor C1 is connected in parallel to the second winding section LS2 only. The first capacitor C1 is connected between the first and the second terminal T1, T2.

Hence, the decoupling circuit in FIG. 2 is asymmetrical.

In this case, the higher voltage (HV) is present at the first capacitor, while the lower voltage (LV) is present at the second capacitor. Hence, an LED load that requires a higher voltage can be connected to the second terminal T2 (and the first capacitor C1).

In contrast to the circuit in FIG. 1, for an LED LED2 that is connected between the second terminal T2 and the first terminal T1, only the first capacitor C1 acts as a decoupling filter. The second capacitor C2 acts as decoupling filter for an LED LED1 that is connected between the third terminal T3 and the first terminal T1.

The converter 100 in FIG. 1 and/or FIG. 2 can be a resonant converter, e.g. an LLC converter, in particular a resonant half bridge LLC converter.

Figure 3A:
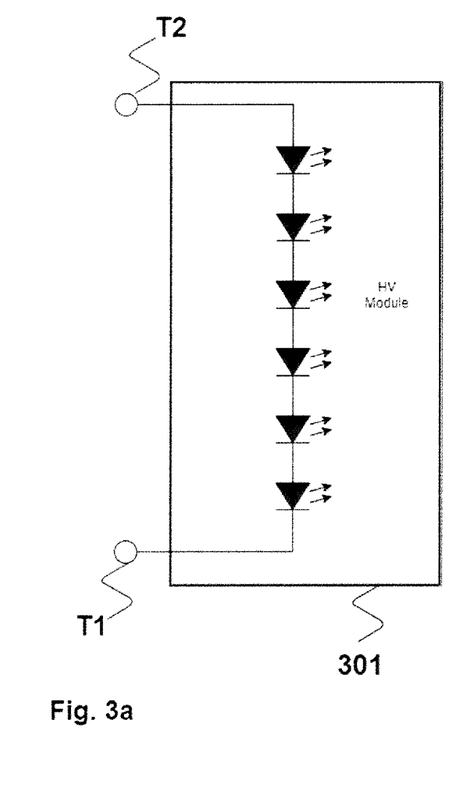
FIG. 3a-c shows schematic diagrams of LED loads connected to the converter of FIG. 1 or 2 according to further embodiments.
Figure 3B:
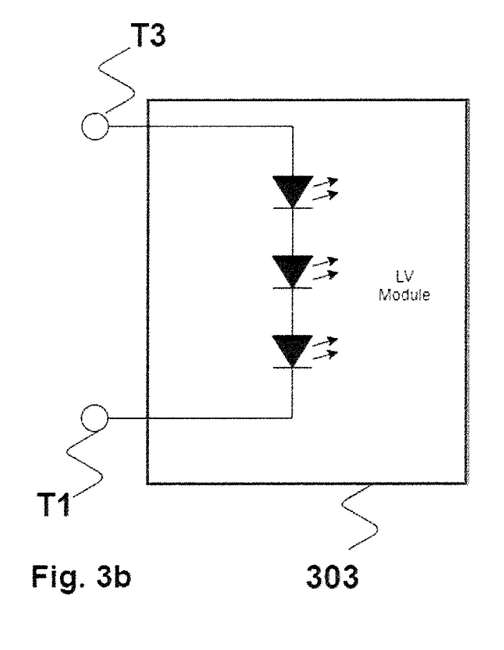
Figure 3C:
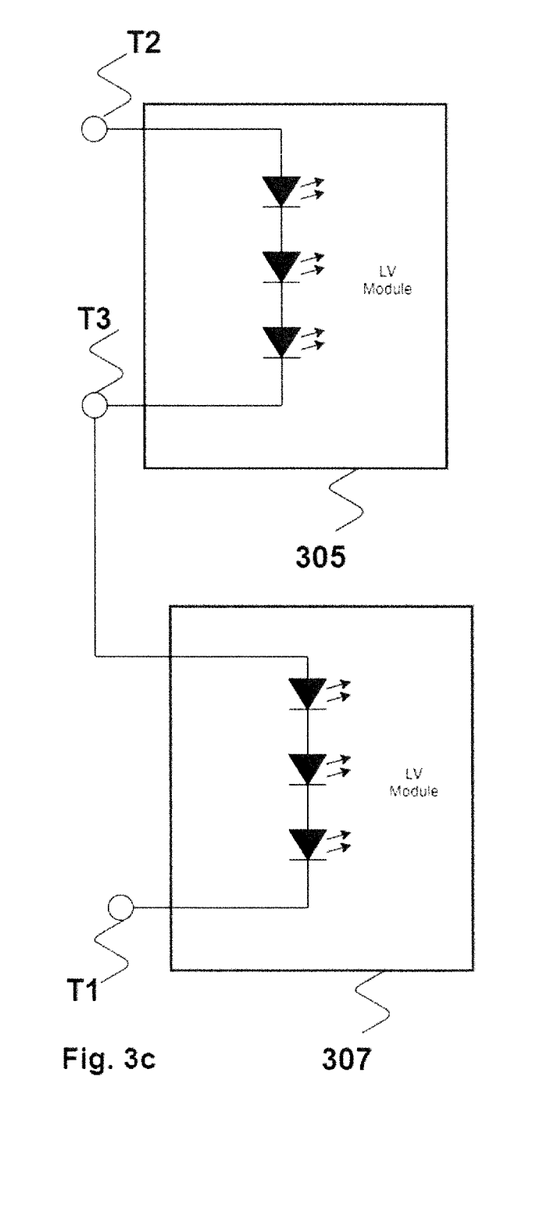

FIG. 3a-c shows schematic diagrams of LED loads connected to the converter 100 of FIG. 1 or 2 according to further embodiments.

In FIG. 3a, a high voltage LED module 301 is connected between the second terminal T2 and the first terminal T1. In this configuration, the LED module 301 is supplied with the high voltage HV.

The high voltage LED module 301 can comprise a plurality of individual LEDs D5, D6, D9, D10, D11, D12, in particular an LED track.

In FIG. 3b, a low voltage LED module 303 is connected between the third terminal T3 and the first terminal T1. In this configuration, the LED module 303 is supplied with the low voltage LV.

The low voltage LED module 303 can be designed to receive a lower supply voltage than the high voltage module 301 in FIG. 3a. For instance, the low voltage LED module 303 comprises a smaller number of individual LEDs D10, D11, D12.

The connections shown in FIGS. 3a and 3b can be realized with the converter 100 from FIG. 1 or 2.

FIG. 3b shows two low voltage LED modules 305, 307 that are connected between the third terminal T3 and the second terminal T2 and the second terminal T2 and the first terminal T1, respectively.

In this configuration, both LED modules 305, 307 are supplied with the low voltage LV.

Each of the low voltage LED modules 305, 307 in FIG. 3c can corresponds to the low voltage LED module shown in FIG. 3b, or to a module, which comprising half of the LEDs of the high voltage module 301 in FIG. 3a.

The converter 100 shown in FIG. 1 is better suited for the configuration shown in FIG. 3b. Due to the symmetrical distribution of decoupling capacitors C1, C2 in FIG. 3b, both LED modules 305, 307 can be connected to a filter with identical capacitance.

Figure 4:
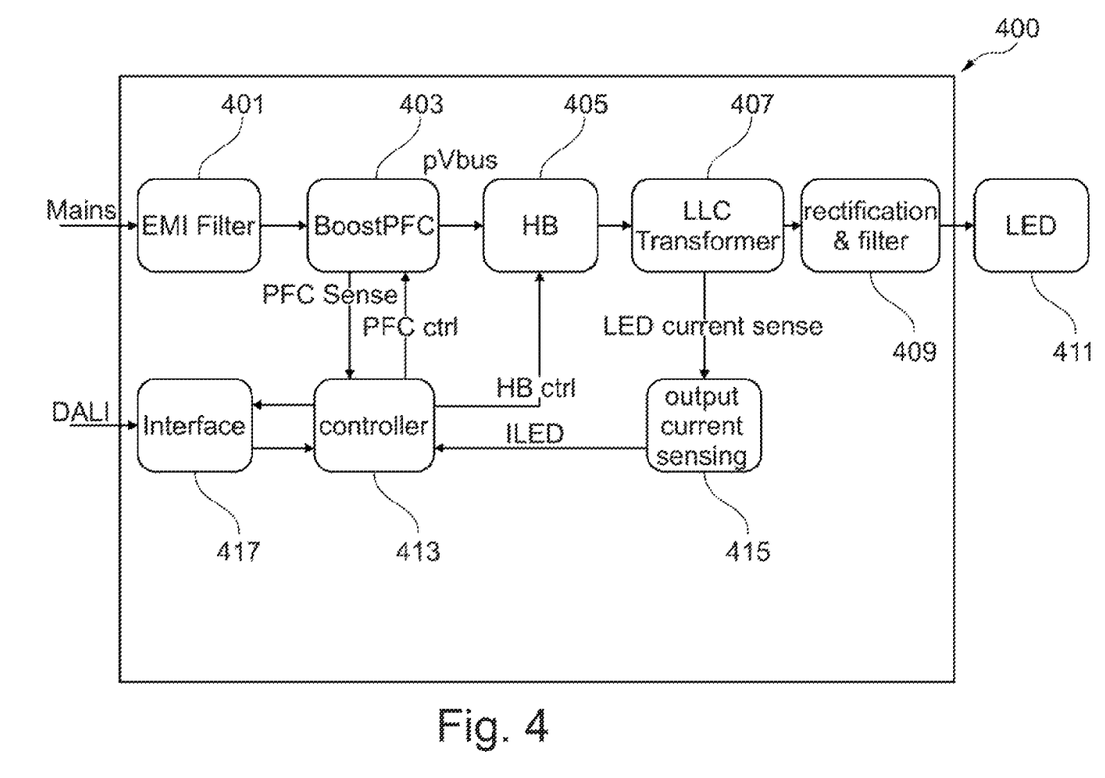
FIG. 4 shows a schematic diagram of a driver for light sources according to an embodiment.

FIG. 4 shows a schematic diagram of a driver 400 for light sources according to an embodiment. The light sources can comprise LED or LED modules, in particular the LED load LED1, LED2.

The driver 400 can comprise an electromagnetic interference (EMI) filter 401 that forwards an input voltage, e.g. a mains voltage, to a PFC circuitry 403, in particular a boost PFC circuit. The PFC circuitry 403 can in turn supply an LLC transformer 407 with a bus voltage via a half bridge 405. The voltage that is generated in the LLC transformer 407 can be forwarded to an LED load 411 via a rectification and filter unit 409.

The half bridge 405, the LLC transformer 407 and the rectification and filter unit 409 can form the converter 100 as shown in FIGS. 1 and 2.

The driver 400 can further comprise a controller 413, e.g. an ASIC. The controller 413 can be configured to control the PFC circuitry 403 and the half bridge 405. Furthermore, the controller can be connected to the LLC transformer 407 via an output current sensing unit 415, to monitor an output voltage of the driver 400.

The driver can further comprise an interface 417, e.g. a DALI interface, for communicating with the controller 413.

Figure 5:
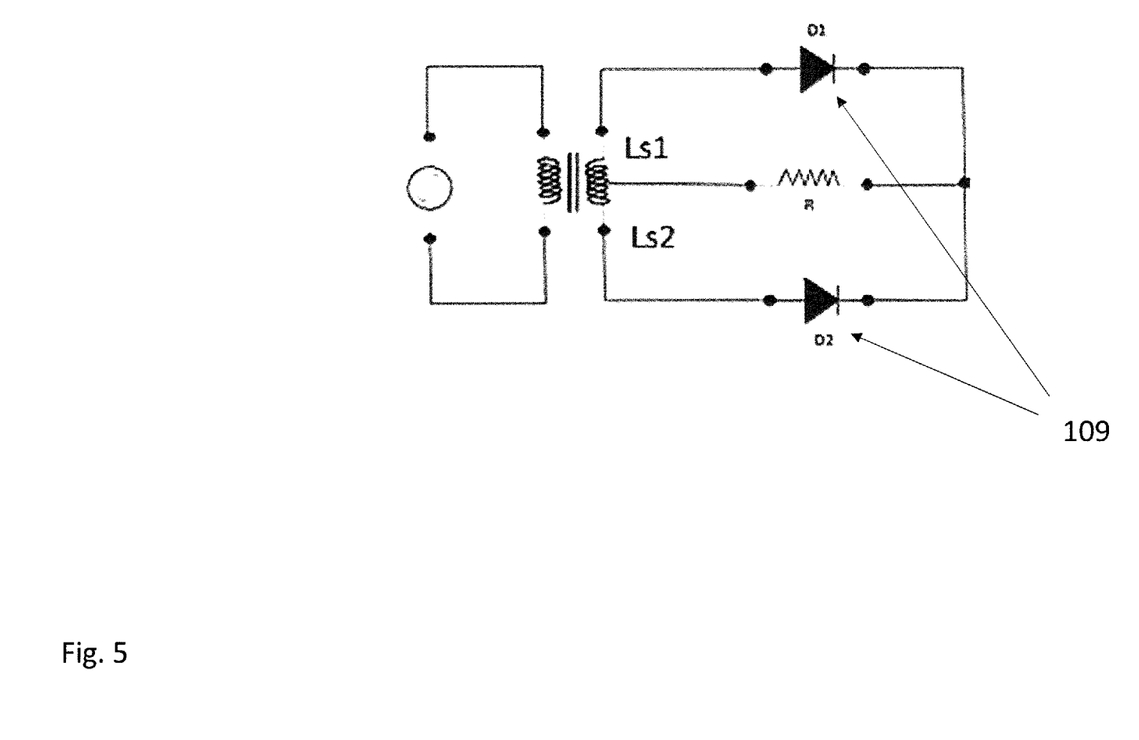
FIG. 5 shows a schematic diagram of a driver comprising a center tap rectifier according to an embodiment.

FIG. 5. shows a converter based on center tap comprising two diodes D1 and D2 in it as well as a center tapped transformer along with that a load R is connected across it. The rectification circuit 109 comprises a center tap rectifier comprising two diodes D1 and D2.

The invention further related to a lighting system, in particular a LED luminaire, comprising a driver according to the invention and a light source operated by the driver.

All features of all embodiments described, shown and/or claimed herein can be combined with each other.

While various embodiments of the present invention have been described above, it should be understood that they have been presented by way of example only and not limitation. Numerous changes to the disclosed embodiments can be made in accordance with the disclosure herein without departing from the spirit of scope of the invention. Thus, the breadth and scope of the present invention should not be limited by any of the above-described embodiments. Rather, the scope of the invention should be defined in accordance with the following claims and their equivalence.

Although the invention has been illustrated and described with respect to one or more implementations, equivalent alternations and modifications will occur to those skilled in the art upon the reading of the understanding of the specification and the annexed drawings. In addition, while a particular feature of the invention may have been disclosed with respect to only one of the several implementations, such features may be combined with one or more other features of the other implementations as may be desired and advantage for any given or particular application.

The invention claimed is:

1. An LED driver (400) having an isolated primary side switched converter (100), said converter comprising:
   a galvanic isolation stage (105) separating a primary side (101) and a secondary side (103) of the converter (100);
   a secondary side winding (107) of the isolation stage (105), wherein the secondary side winding (107) is coupled to a primary side winding, and wherein the secondary side winding (107) comprises a center tap;
   a first terminal (T1), a second terminal (T2) and a third terminal (T3) for connecting one or more LED loads (LED1, LED2) on the secondary side (103) of the converter (100)
   a rectification circuit (109) on the secondary side (103) of the converter (100), wherein the rectification circuit (109) is configured to set the first terminal (T1) at a first electrical polarity, and to set the second and the third terminal (T2, T3) at a second electrical polarity that is different to the first electrical polarity;
   wherein the third terminal (T3) is electrically connected to the center tap; and
   a decoupling circuit for reducing voltage fluctuations between the first and the second terminal (T1, T2), between the first and the third terminal (T1, T3) and between the second and the third terminal (T2, T3), said decoupling circuit comprising a first capacitor (C1) in parallel with the second terminal (T2) and third terminal (T3) and a second capacitor (C2) in parallel with the first terminal (T1) and third terminal (T3), wherein the first capacitor (C1) and the second capacitor (C2) are in series with one another and the series is in parallel with the first terminal (T1) and the second terminal (T2);
   wherein a voltage between the second and the first terminal (T2, T1) is larger than a voltage between the third terminal and the first terminal (T3, T1) and also larger that a voltage between the second terminal and the third terminal (T2, T3); and
   wherein the driver further comprises a controller, an output current sensing unit and a communications interface connected to the controller.

2. The LED driver according to claim 1, wherein the secondary side (103) winding comprises no further tapping besides the center tap.

3. The LED driver according to claim 1, wherein the first and the second capacitor (C1, C2) have the same capacitance.

4. The LED driver according to claim 1, wherein the rectification circuit (109) comprises a center tap rectifier.

5. The LED driver according to claim 1, wherein the rectification circuit (109) comprises a full wave bridge rectifier.

6. The LED driver according to claim 1, wherein the rectification circuit (109) comprises four diodes (D1, D2, D7, D8) or four switches.

7. The LED driver according to claim 1, wherein the isolated primary side switched converter (100) is a resonant half bridge LLC converter.

8. The LED driver according to claim 1, wherein the rectification circuit (109) comprises a center tap rectifier.

9. The LED driver according to claim 1, wherein the rectification circuit (109) comprises a full wave bridge rectifier.

10. The LED driver according to claim 1, wherein the rectification circuit (109) comprises four diodes (D1, D2, D7, D8) or four switches.

11. The LED driver according to claim 1, wherein the isolated primary side switched converter (100) is a resonant half bridge LLC converter.

12. An LED driver having an isolated primary side switched converter (100), said converter comprising:
- a galvanic isolation stage (105) separating a primary side (101) and a secondary side (103) of the converter (100);
- a secondary side winding (107) of the isolation stage (105), wherein the secondary side winding (107) is coupled to a primary side winding, and wherein the secondary side winding (107) comprises a center tap;
- a first terminal (T1), a second terminal (T2) and a third terminal (T3) for connecting one or more LED loads (LED1, LED2) on the secondary side (103) of the converter (100), and
- a rectification circuit (109) on the secondary side (103) of the converter (100), wherein the rectification circuit (109) is configured to set the first terminal (T1) at a first electrical polarity, and to set the second and the third terminal (T2, T3) at a second electrical polarity that is different to the first electrical polarity, wherein the third terminal (T3) is electrically connected to the center tap; and
- a decoupling circuit for reducing voltage fluctuations between the first and the second terminal (T1, T2) and between the first and the third terminal (T1, T3), said decoupling circuit comprising a first capacitor (C1) in parallel with the second terminal (T2) and first terminal (T1) and a second capacitor (C2) in parallel with the first terminal (T1) and third terminal (T3), wherein the first capacitor (C1) and the second capacitor (C2) are not in series;
wherein a voltage between the second and the first terminal (T2, T1) is larger than a voltage between the third terminal and the first terminal (T3, T1); and
wherein the driver further comprises a controller, an output current sensing unit and a communications interface connected to the controller.

13. The LED driver according to claim 12, wherein the first and the second capacitor (C1, C2) have the same capacitance.

* * * * *